United States Patent [19]

Kick

[11] Patent Number: 4,774,578

[45] Date of Patent: Sep. 27, 1988

[54] CIRCUIT ARRANGEMENT FOR PROCESSING PICTURE DATA

[75] Inventor: Horst Kick, Walzbachtal, Fed. Rep. of Germany

[73] Assignee: Siemens Aktiengesellschaft, Munich, Fed. Rep. of Germany

[21] Appl. No.: 880,792

[22] Filed: Jul. 1, 1986

[30] Foreign Application Priority Data

Jul. 3, 1985 [DE] Fed. Rep. of Germany ....... 3523840
Sep. 19, 1985 [DE] Fed. Rep. of Germany ....... 3533491

[51] Int. Cl.[4] .......................... H04N 5/14; H04N 5/222
[52] U.S. Cl. ...................................... 358/160; 358/183; 358/22; 358/185
[58] Field of Search ................. 358/160, 11, 12, 21 R, 358/22, 256, 141, 142, 284, 181, 183, 280, 185

[56] References Cited

U.S. PATENT DOCUMENTS 3,976,982  8/1976  Eiselen .
4,689,823  8/1987  Wojcik et al. ...................... 358/160

OTHER PUBLICATIONS

Der Elektroniker, No. 1 (1985), pp. 59–67.

Primary Examiner—James J. Groody
Assistant Examiner—Michael D. Parker
Attorney, Agent, or Firm—Kenyon & Kenyon

[57] ABSTRACT

Several picture memories (SP1, SP2, SP3, SP4) are provided, in each of which the picture data of a picture are stored. The input of a logic circuit (VL) is connected to the outputs of the picture memories. The output signals of the logic circuit are fed to the picture memories. The logic circuit (VL) may comprise a multiplexer, to the control inputs (A, B, C) of which the signals to be interlinked are fed, and to the data inputs (E1, E2 ... E8) of which the code signals are fed characterizing the kind of logical interconnection. The main field of application is in the digital evaluation of television pictures.

7 Claims, 5 Drawing Sheets

FIG 1

|   | E8 | E7 | E6 | E5 | E4 | E3 | E2 | E1 |
|---|---|---|---|---|---|---|---|---|
| A | 1 | 0 | 1 | 0 | 1 | 0 | 1 | 0 |
| B | 1 | 1 | 0 | 0 | 1 | 1 | 0 | 0 |
| C | 1 | 1 | 1 | 1 | 0 | 0 | 0 | 0 |
| $A \cdot B \cdot C = (AND)$ | 1 | 0 | 0 | 0 | 0 | 0 | 0 | 0 |
| $A + B + C = (OR)$ | 1 | 1 | 1 | 1 | 1 | 1 | 1 | 0 |
| $(A \cdot B) + C$ | 1 | 1 | 1 | 1 | 1 | 0 | 0 | 0 |
| $(A \cdot B) + (\overline{A} \cdot C)$ | 0 | 0 | 1 | 0 | 0 | 1 | 1 | 1 |
| $A \cdot B$ | 1 | 0 | 0 | 0 | 1 | 0 | 0 | 0 |
| $\overline{A}$ | 0 | 1 | 0 | 1 | 0 | 1 | 0 | 1 |

CIRCUIT ARRANGEMENT FOR PROCESSING PICTURE DATA

BACKGROUND OF THE INVENTION

The present invention relates to a circuit arrangement for processing picture data.

It is known, for instance, from the journal "Der Elekroniker", no. 1, 1985, pages 59 to 67, to store, for evaluating pictures which were taken with a television camera, the picture signals in a memory, from which they are fed to a computer for evaluation, for instance, for pattern recognition. It is frequently not necessary to store the picture signals with several grey-scale steps, but it is sufficient to convert them into binary signals by means of a threshold stage. A binary picture is thus obtained, the picture data of which merely indicate whether the corresponding picture dot is bright or dark.

The picture data derived directly from the video signal contain a multiplicity of information which is not necessary for the evaluation or even interferes with the evaluation, and which heavily loads the evaluation computer and thereby decreases the processing rate.

SUMMARY OF THE INVENTION

It is an object of the present invention to provide a circuit arrangement, by which the binary video signals can be preprocessed at the rate with which they are generated.

The above and other objects of the present invention are achieved by a circuit arrangement for processing picture data having a picture memory which is loaded with the picture data, the picture data adapted to be supplied to an evaluation computer means, the picture memory comprising a plurality of memory means into each of which the picture data of one picture can be stored, each of the memory means having an output to which a logic circuit means can be coupled, an output of said logic circuit means being coupled to an input of the picture memory.

Thus, several memory means are provided, in each of which a binary picture is stored, the picture signals of which are logically interlinked with the actual data signals furnished by the camera or with picture signals which are contained in a further picture memory.

The logic circuit is advantageously designed so that it can execute selectably several types of logical interlinkages such as AND, OR, NOT etc. For this purpose, it advantageously comprises a multiplexer, to the control input of which the signals to be interlinked are fed and to the data inputs of which a signal combination (logic code) are fed such that with the respectively fed-in signals, the correct signal according to the desired logic function is delivered. Each logic function requires its own code. The entirety of the logic code is advantageously deposited in a memory, for instance, the working memory of the evaluating computer, and can be called up from there. It is frequently necessary to shift pictures in order to determine correlations of objects, to find boundary regions or to suppress interference. For this purpose, a shifting device is advantageously provided, by which the picture data are read out of the picture memory or are written into it with lead or lag and specifically in such a manner that this corresponds to a picture shift. By logically interlinking the picture signals of the shifted and the unshifted picture, correlations can be formed and undesired portions of the picture can be removed.

If picture data are to be interlinked and processed which represent grey values, the logic circuit is advantageously an arithmetic and logic unit which executes logic and/or arithmetic operations with the picture data.

For pre-processing picture data such as separating disturbances, recognizing strips of a given width, picture changes and the like, the picture data can be filtered by feeding them as an address to a filter memory, in which an output signal is stored for every picture data combination and every desired filter function. If picture data of adjacent picture elements of a single picture are to be filtered, these picture data are fed as an address to the filter memory. If picture data of picture elements of the same location of pictures taken at different times are to be filtered, the pictures are stored in different regions of a picture memory, and the picture data associated with elements with the same location are read out in parallel and fed to the filter memory as addresses.

BRIEF DESCRIPTION OF THE DRAWINGS

An embodiment of the invention as well as further advantages and further developments of the invention are described and explained in further detail in the following, making reference to the drawings, in which.

DETAILED DESCRIPTION

Figure 1:
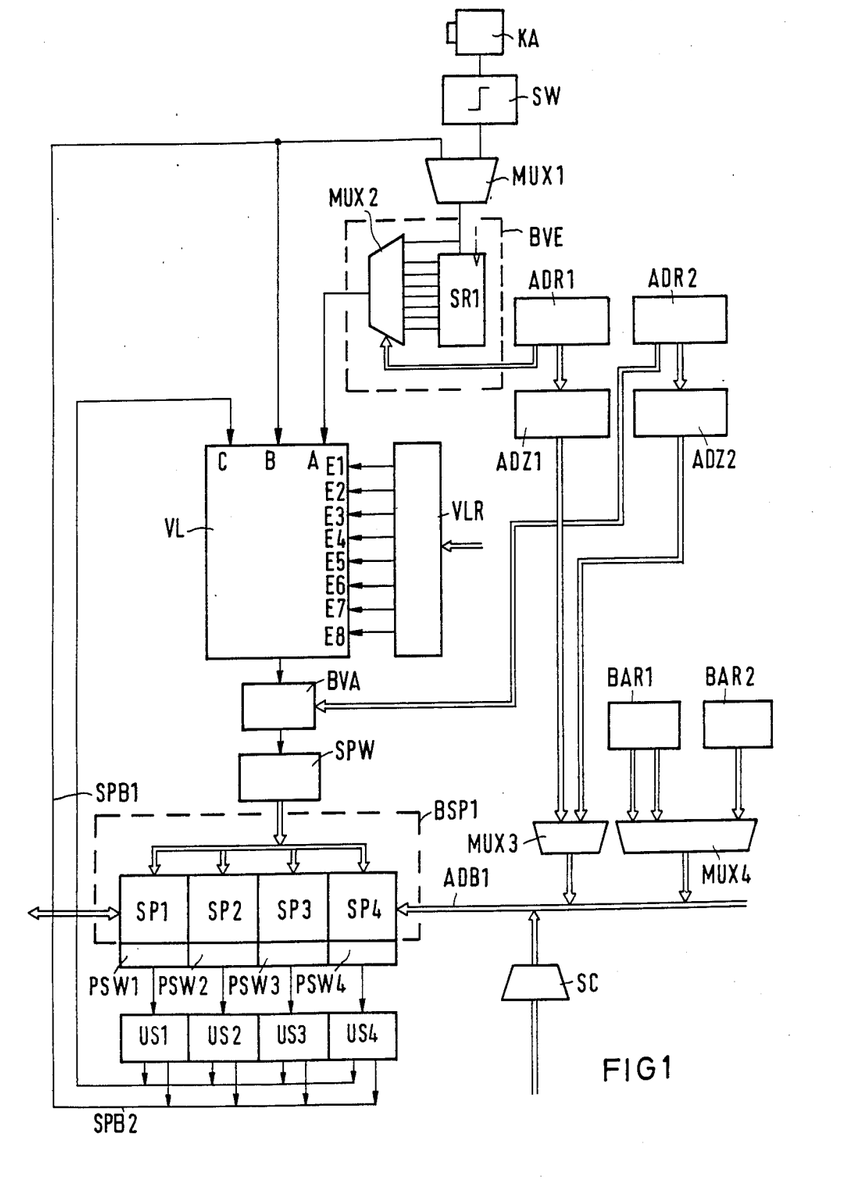
FIG. 1 is the basic block diagram of an embodiment of the circuit arrangement according to the invention.

With reference now to the drawings, in FIG. 1, a picture memory is designated with BSP1 which contains four memories SP1, SP2, SP3, SP4, in which picture signals for one picture each can be stored. They are addressed in parallel by feeding them an address via an address bus ADB1, so that the corresponding cells of memories selected by additional signals are read out simultaneously; their output signals which are conducted via respective parallel-series converters PSW1, PSW2, PSW3, PSW4 are switched to two bus lines SPB1, SPB2 by means of double-throw switches US1, US2, US3, US4. To the bus lines SPB1, SPB2 are connected inputs B, C of a logic circuit VL. The signals on the bus line SPB1 can further be fed via a multiplexer MUX1 and a delay circuit BVE to be described later on, also to an input A of the logic circuit VL. The second input of the multiplexer MUX1 is connected to a threshold circuit SW which converts the video signal of a camera KA into a binary signal. The logic circuit VL is designed so that it can interlink three binary signals fed to their inputs A, B, C in accordance with any desired logic function. The respective linking function is given by an 8-bit logic code which is entered into a register VLR, for instance, from the memory of an attached evaluation computer, not shown. The logic circuit consists advantageously of a multiplexer, for instance, a type 74 LS 151 of Texas Instruments, to the data inputs E1, E2 . . . E8 of which are fed the logic code from the computer and to the control inputs A, B, C of which are fed the signals to be interlinked.

Figure 2:
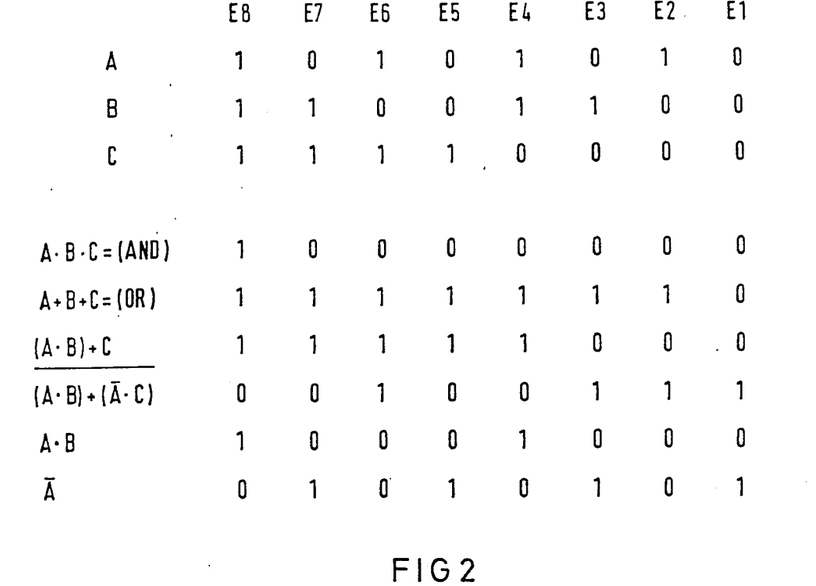
FIG. 2 illustrates the function of the logic circuit of the embodiment of FIG. 1.

Referring to FIG. 2, the operation and the formation of the logic code will be explained in detail. In the top line, the data inputs E1, E2, E3 . . . E8 are given, to which the signals from the register VLR are fed. In the second to fourth lines, all signal combinations are listed one below each other which can be fed to the inputs A, B, C. With each input is associated a signal combination with the effect that, if these signal combinations are applied to the inputs A, B, C, the signal at the corresponding input E1, E2 . . . is put through to the output. If the signals at the inputs A, B, C are to be interlinked in accordance with an AND function, a code 1000 0000 is fed to the inputs E1, . . . E8 (line 5). At the output of the logic circuit VL then appears a logical "1" signal only in the case that a logical "1" is applied to all three inputs A, B, C. In the case of the OR-function (A+B+C), the combination is 1111 1110 (line 6). For inverting the signal fed to the input A, the combination is 0101 0101 (line 10) and for the AND-linkage of the signals fed to the inputs A and B, the signal combination 1000 1000 is required, independently of the signal at the input C (line 9). Also complex logical linkages such as (A.B)+C or (A.B)+(A.C) can be realized, as shown in lines 7 and 8. Overall, 256 logic functions are possible, i.e., all possible linkages for three input variables. If only two input signals are to be interlinked, a multiplexer with four data inputs is sufficient. If, on the other hand, the number of input variables is four, 16 data inputs are required. In any case, the interlinking takes place at the picture element frequency of, for instance, 12 MHz.

To the output of the logic circuit VL is connected a further logic circuit BVA which in turn is coupled to the data inputs of the picture memory BSP1. It is therefore possible, for instance, to read out data from two of the memories SP1, SP2, SP3, SP4 via the two bus lines SPB1, SPB2, to link them with each other and optionally with picture data derived from the current video signal and to enter them into a third memory or also into a memory from which the data were read out. This makes possible fast pre-processing of picture data, which relieves the evaluation computer.

In addition, the picture data can be pre-processed by means of shifting operations, by which the entering and/or reading-out of the stored and/or actual picture data is shifted in time such that the corresponding picture is shifted a given number of picture elements in the line direction and/or perpendicularly thereto from the original picture. In the simplest case, this can be achieved by a modification of the read and/or write addresses of the memories. For this purpose, it is necessary that the data of the individual picture elements are accommodated in separate storage cells and can thus be addressed individually. In the embodiment, the data of eight successive picture elements are combined by means of a series-parallel converter SPW to form an 8-bit word for the purpose of extending the required access times, and stored in a storage cell. With a resolution of the television image of 512 picture elements per line and 256 lines, every memory then has a capacity of 16k×8 bits, four such memories being provided as per FIG. 1. Additionally, several memory planes can further be provided which can be selected by so-called paging.

Figure 3:
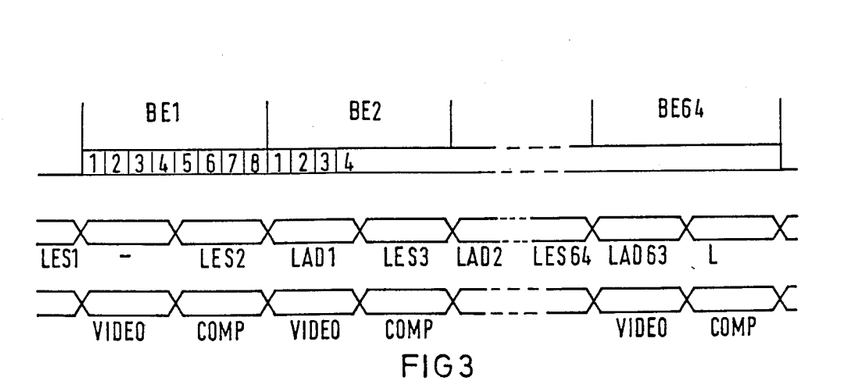
FIG. 3 shows the reading and loading of the picture memory.

In FIG. 3, the reading-out and writing-in of data from or into the picture memory are illustrated. The eight picture dots side by side, the data of which are stored in a storage cell, are combined to form a picture element BE1, BE2, . . . BE64, so that a line with 512 picture dots contains 64 picture elements. This is illustrated for the first line. If the data from two memories are to be interlinked with each other and optionally with actual picture data and the interlinked data are re-entered into a memory, then two storage cycles are required per picture element and specifically, a read cycle LESi and a loading cycle LADi. The data of the picture element BE2 are read during the second cycle of the picture element BE1 and the interlinked data are loaded during the first cycle LAD2 of the picture element BE2. In the meantime, the interlinked data of the picture element BE1 are loaded and the data of the picture element BE3 are read (LES3). The memory addresses 2, 1, 3, 2 . . . or generally n, n−1, n+1, n, n+2. . . must therefore be formed successively. For generating this address sequence, the embodiment according to FIG. 1 contains two address counters ADZ1, ADZ2 which can be pre-set independently of each other with the contents of two address registers ADR1, ADR2. If the address counter ADZ1 furnishes the read addresses and the address counter ADZ2 the loading addresses, the address sequence given above is generated if the counter ADZ1 is pre-set at the beginning of a reading/loading cycle to 1 and the counter ADZ2 to 0. In the process, the outputs of the counters ADZ1, ADZ2 are switched by a multiplexer MUX3 alternatingly via the address bus ADB1 to the picture memory BSP1 and its reading is increased by 1 after each reading or loading operation. The multiplexer MUX 3 is controlled, like the other units of the arrangement according to FIG. 1, by an attached computer which may be the evaluation computer.

Into a register BAR1, the number of the memory plane can be entered, to which access is to be established. With the content of a register BAR2, different planes can be selected for video access separately for reading and writing. Via a switch SC, base addresses by which the physical addresses of the picture memory are generated, can be switched to the address bus ADB1. The multiplexers MUX3, MUX4 as well as the switch SC are advantageously controlled by means of a microprogram running in the evaluation computer.

The free pre-setting of the address counters ADZ1, ADZ2 permits the shift reading-out and writing-in of the picture data as compared to the actual picture signals of the same picture elements. For a vertical shift, the counter reading per line is increased or decreased by 64, since the lines each contain 64 picture elements and a storage location is provided for each picture element, the storage locations being consecutive. The shift in the line direction could be achieved by a simple address modification only in jumps of eight picture elements. The shift by picture elements is accomplished in the time delay circuits BVE, BVA, to which three bits each, corresponding to a picture shift of zero to seven picture elements, are fed from the registers ADR1, ADR2. The design of the two time delay circuits is the same. Each consists of a shift register SR1, to the input of which the picture data and a shift clock frequency with the picture element frequency are fed. The input signal and the outputs of the seven first stages are connected to the inputs of a multiplexer MUX2 which is controlled by the three bits of the register ADR1 and ADR2, respectively. A further bit is fed-in for modifying the addresses of the address counters ADZ1, ADZ2 for an additional shift of the picture in the direction of the lines by one picture element. Thus, a total shift of −7 to +8 picture dots or 0 to 15 such dots is possible.

In the embodiment shown, two shifting circuits are provided. In principle, however, a single one is sufficient. While with stored picture data, positive and negative shifts are possible, actual picture data can only be delayed, i.e., interlinked with positive shift, and entered into the memory.

Figure 4:
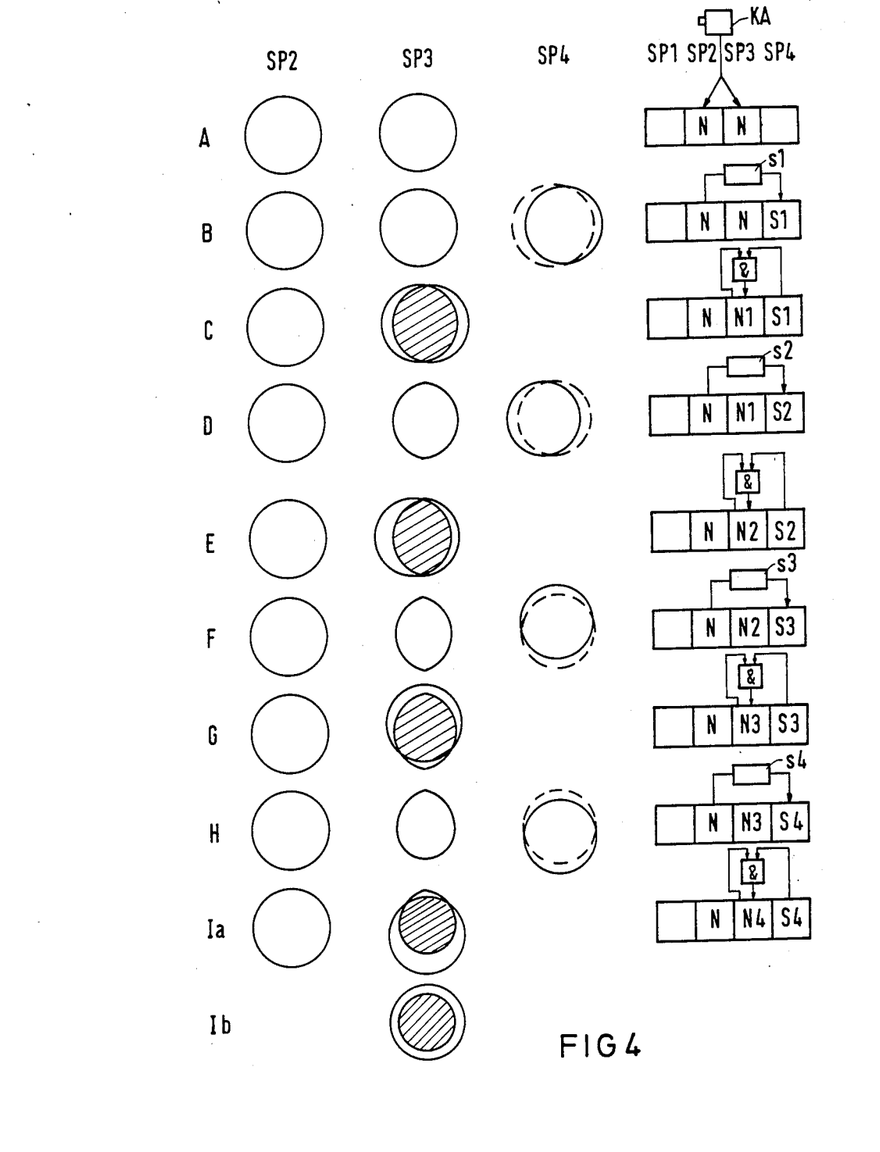
FIG. 4 shows the operation of the embodiment of FIG. 1 in improving the picture quality of the picture.

The combination of interlinking and shifting can be used for cleaning-up pictures, i.e., the suppression of interfering image structures which are generated due to signal noise or other disturbing effects, as is shown in FIG. 4. The contents of the memories SP2, SP3, SP4 are presented in the three lefthand columns; on the right-hand side, the processing of the memory contents is illustrated. The original picture data N are entered parallel into the two memories SP2, SP3 (line A). The content of the memory SP2 is subjected to a shift operation s1 in the positive X-direction, where the shift should amount to four picture points. The picture data S1 so shifted are entered into the memory SP4 (line B). In step C they are logically interlinked with the content of the memory SP3 according to an AND function and the result N1 which is shown as a shaded area, is written into the memory SP3. In step D, the content of the memory SP2 is subjected to a shifting operation s2, corresponding to a picture shift by four picture points to the left and the result S2 is written into the memory SP4. The result of the AND interlinkage which is carried out in step E and is written into the memory SP3, is again presented as a shaded area. In steps F and H a shift by four picture elements upward or downward is carried out in shifting operations s3, s4, and in the subsequent steps G and I, the AND interlinkage is carried out. The result is illustrated in line Ib; of the original object picture, the edge is removed almost uniformly. It will be seen that objects or interference spots, the dimensions of which are, with a shift of respectively four picture elements, eight picture elements or smaller, disappear. The direction of the shift will be adapted to the structure of the interfering picture structures to be eliminated. For suppressing circular or unknown structures, the above-described method will be used which can be supplemented and thereby improved by four further shifts (±45° and ±135° relative to the direction of the lines) and subsequent AND linkages. For suppressing parallel stripes which may extend in any direction, a shift perpendicular to these stripes is sufficient; the shift, of course, must be at least equal to the width of the stripes.

For the further picture evaluation, the picture data must as a rule again be modified in such a manner that the stored images of the objects to be evaluated must again be brought to their original size. This is likewise accomplished by shifting and subsequent logical interlinking, the interlinkage, however, being an OR-function.

Shifting and interlinking operations can also be carried out with the picture data of grey images, in which several bits describing the grey value are stored for each picture element. The interlinking logic then consists of an arithmetic and logic unit (ALU) which executes arithmetic operations in addition or instead of logic operations.

Figure 5:
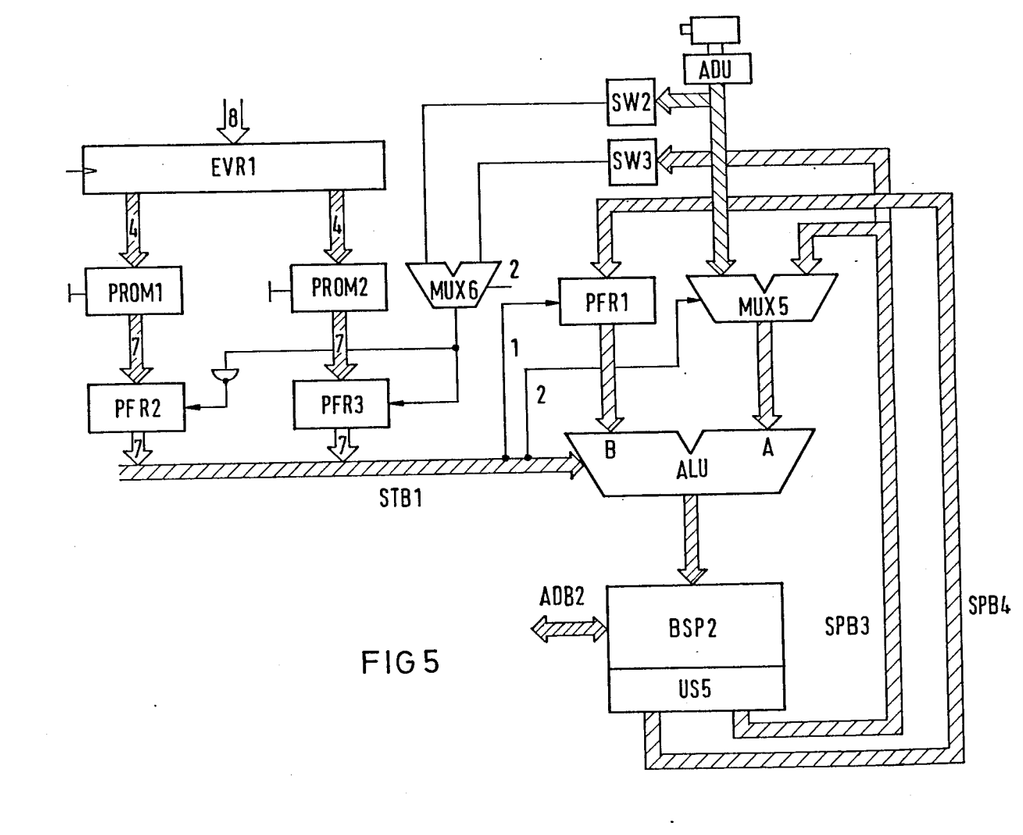
FIG. 5 shows the basic block diagram of an arrangement for processing and interlinking picture data representing grey values.

FIG. 5 shows the basic diagram of a circuit arrangement by which the picture data can also be subjected to arithmetic operations; more specifically, the operations may be different within and outside a mask which is within the measuring field. The arrangement according to FIG. 5 contains a picture memory BSP2, in which at least two digitized grey pictures can be stored. "Digitized grey pictures" means that the grey value of each picture element is represented as a digital value of, for instance, 6 bits, corresponding to 64 grey steps. These grey values are first generated in an analog/digital converter ADU which is connected to a camera, not shown. The digitized grey values are fed to one input of a multiplexer MUX5, the output of which is connected to one input A of an arithmetic and logic unit ALU. To the output of the latter, the picture memory BSP2 is connected. In the simplest case, the grey values digitized by the analog/digital converter ADU can be entered into the picture memory BSP2 unchanged.

As already mentioned, the picture memory contains several regions in each of which a complete picture can be stored. The picture data read from the individual regions can be switched selectably to two memory lines SPB3, SPB4. The memory line SPB3 leads to the second input of the multiplexer MUX5 and the line SPB4 to a buffer register PFR1, the output of which is connected to a second input B of the arithmetic and logic unit ALU. The multiplexer MUX5 can be controlled via a control bus STB1 in such a manner that it either puts through the picture data from the memory line SPB3 or actual picture data from the analog/digital converter ADU to the input A of the arithmetic and logic unit ALU or that it blocks its input signals. The buffer register PFR1 can likewise be released via the control bus STB1 or can be blocked. Also, the control input of the arithmetic and logic unit ALU is connected to the control bus STB1. It can therefore execute a multiplicity of operations on data of two stored pictures which are transmitted via the lines SPB3, SPB4 or of an actual and a stored picture or only on actual picture data or on stored picture data which are transmitted over the line SPB3 or the line SPB4. The results of the operation are entered into the memory BSP2 as new picture data. The scanning of pictures in the camera and the readout of the picture memory BSP2 are in general synchronized so that the picture data of picture points with the same position are fed to the unit ALU simultaneously or with a defined desired shift in time. The picture data contained in the memory can be transmitted to an evaluation computer via a line ADB2.

A control word determining the operation of the unit ALU is entered into a control register EVR1. The control word of 8 bits is fed, subdivided, to two read-only memories (PROMs) PROM1, PROM2, the output signals of which are operation codes for the unit ALU. The operation code from the memory PROM1 is to apply to the region outside the mask and the operation code from the memory PROM2 to the region inside the mask. They are interim-stored in two buffer registers PFR1, PFR2. Their readout from these registers to the control bus STB1 is controlled by mask signals delivered by a multiplexer MUX6. The latter puts through either the signal of a threshold stage SW2 which is connected to the analog/digital converter ADU, or of a threshold stage SW3 which receives picture data via the memory line SPB3, or it blocks the signals at both inputs, so that then the content of the buffer register PFR2 is always switched to the control bus STB1. In the other two cases, the readout of the buffer registers PFR2, PFR3 is controlled either by the content of the actual picture or of the stored picture. The operating codes control not only the unit ALU but also the buffer register PFR1 and the multiplexer MUX5.

Figure 6:
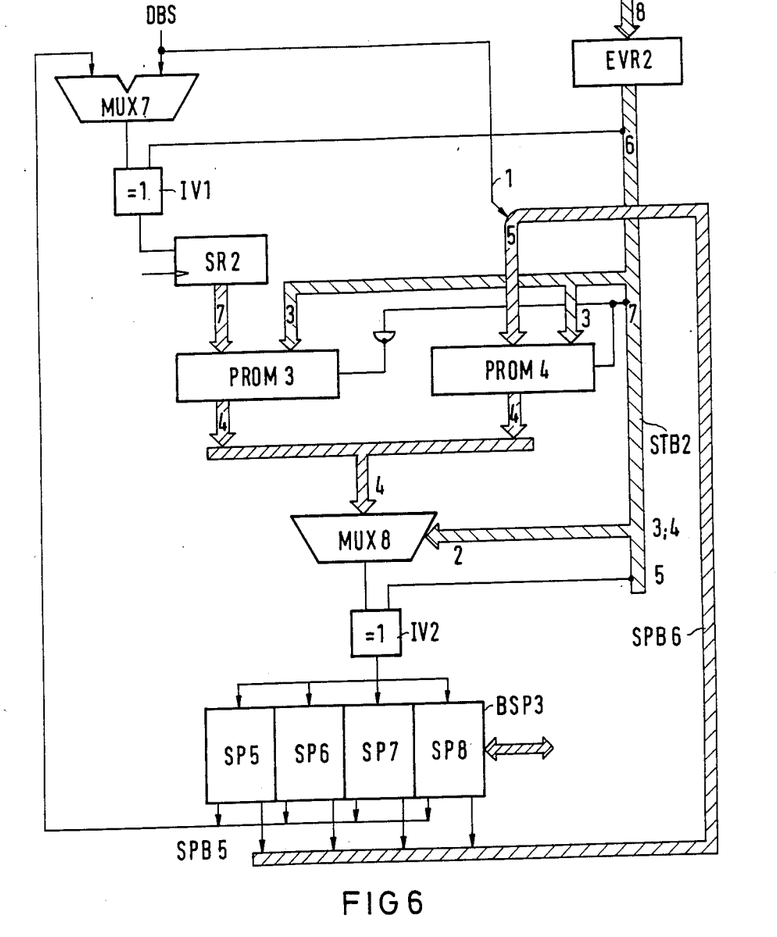
FIG. 6 shows the block diagram of an arrangement for filtering the picture data of picture elements of a picture located side by side or vertically or of picture elements with the same location in several pictures taken at different times.

A type of preprocessing of picture data frequently required is filtering. This is understood to mean, for instance, that picture data for individual picture elements are generated as a function of the picture data of adjacent picture elements or of picture dots of pictures following each other in time. In FIG. 6, the basic block diagram of an arrangement is shown, by which picture data of picture dots located side by side or vertically or of picture data with the same position in several successive pictures are filtered. A picture memory BSP3 consists of four memory areas SP5, SP6, SP7, SP8, in each of which a binary picture can be stored. For filtering picture data of picture dots located side by side or vertically, the corresponding memory content is fed via a memory line SPB5 to a multiplexer MUX7, to the output of which an inverter IV1 is connected which can be turned on and off. To a second input of the multiplexer MUX7 are fed via a line DBS the binary signals of an actually generated picture, so that the picture data of adjacent picture dots of an actually generated picture can be filtered if the picture data are put through to the inverter IV1. The output signals of the inverter IV1 are shifted at the picture-dot frequency or the readout clock frequency of the picture memory BSP3 into a shift register SR2 serving as a series-parallel converter. To the latter, a first filter memory PROM3 is connected, in which the desired filter functions for all signal combinations furnished by the shift register SR2 are contained. The respectively selected filter function is contained as a control word in a control register EVR2 which is loaded by an evaluation computer. Part of the control word is fed to the filter PROM3 as a basic address which is supplemented by the data readout from the shift register SR2 to form the complete memory addresses. With a further bit of the control word, the memory PROM3 is enabled. By the same bit, a second filter memory PROM4 is blocked which serves for filtering picture data of pictures following each other in time. From the so addressed storage cell, a signal combination containing still further filter functions is read out to a multiplexer MUX8 which is controlled by further digits of the control wrrd of the register EVR2 such that only the signal of the desired filter function is put through. This signal arrives via a further inverter IV2 which can be switched on and off at the picture memory BSP3 and can be entered there in one of the areas SP5 . . . SP8.

For filtering the picture data of picture elements of pictures taken at different times, they are stored in the storage areas SP5 . . . SP8, the filter memory PROM3 is blocked and the memory PROM4 is released. The latter contains all desired filter functions of which one group each is contained in one memory region. Part of the control word serves as the base address for these memory areas. The base address is supplemented by the picture data read out in parallel from the picture memory areas SP5 . . . SP8 and the actual picture datum on the line DBS. The content of the so addressed memory cell gets to the input of the multiplexer MUX8 which is connected by a further part of the control word contained in the register EVR2 such that the bit of the desired filter function is put through to the inverter IV2.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A circuit arrangement for processing picture data having a picture memory which is loaded with the picture data, the picture data adapted to be supplied to an evaluation computer means for processing the picture data, the picture memory comprising a plurality of memory means into each of which the picture data of one picture can be stored, each memory means having an output to which logic circuit means are coupled, an output of said logic circuit means being coupled to an input of the picture memory, and further comprising means for supplying current picture data from camera means to a further input of the logic circuit means, the logic circuit means comprising multiplexer means having a plurality of control inputs for performing a selected logic operation on the picture data, the picture data to be subjected to the logic operation being supplied to the control inputs, said multiplexer means further having a plurality of data inputs, a logic code being supplied to said data inputs by said evaluation computer means for effecting a selected logic operation.

2. The circuit arrangement recited in claim 1, further comprising means for addressing the picture memory so that at least one of loading into and reading of the picture data stored therein is variable whereby the picture data can be subjected to a shifting operation.

3. The circuit arrangement recited in claim 2, further comprising series-parallel conversion means having an output coupled to an input of said picture memory and having an input coupled to an output of said logic circuit means, said picture memory comprising a plurality of storage cell means for storing the picture data of a plurality of picture elements lying side by side in a direction of lines of the picture, parallel-series conversion means coupled to an output of the picture memory, time delay circuit means coupled to an output of said parallel-series conversion means, a delay time of said time delay circuit means being an integral multiple of a period of a picture element, whereby shifting of the picture elements in a direction of a line of the picture can be performed.

4. The circuit arrangement recited in claims 2 or 3 for removing interference in picture elements, the dimensions of the interference at least in one direction being smaller than those of the picture parts to be evaluated, whereby the picture data are subjected to a logical operation and modified in accordance with a picture shift with unmodified picture data in a first phase, and the picture data modified in the first phase are shifted and subjected to a logical operation in a second phase such that the modifications made in the first phase are compensated.

5. The circuit arrangement recited in claim 1 wherein the logic circuit means comprises an arithmetic and logic unit for performing one of arithmetic or logical operation on the picture data representing respective grey values of a picture element, said arithmetic and logic unit having at least one input coupled to further multiplexer means, said further multiplexer means supplying picture data from one of two picture data sources selectably to the aritmetic and logic unit, different control signals for the arithmetic and logic unit corresponding to the logical operation to be performed on the picture data being fed via a plurality of buffer register means responsive to a plurality of mask signals.

6. The circuit arrangement recited in claim 1, wherein the picture data of sequentially photographed pictures are stored in said plurality of memory means, and further comprising a filter memory having address inputs connected to outputs of said plurality of memory means, said picture data being selected in parallel from said plurality of memory means and being fed as addresses to the address inputs of said filter memory, and wherein an output signal is stored for each picture data combination and for each filter function, said output signal being fed to inputs of the plurality of memory means by an additional multiplexer means.

7. The circuit arrangement recited in claim 1, further comprising a shift register for receiving picture data of adjacent picture elements of a picture, and a filter memory having address inputs connected to outputs of the shift register and wherein an output signal is stored for each possible picture data combination contained in the shift register and for each desired filter function, said outputs being connected to inputs of said plurality of memory means via an additional multiplexer.

* * * * *